Feb. 10, 1925.

L. H. VAN BRIGGLE

CARBURETOR

Filed Aug. 26, 1918

1,526,259

2 Sheets-Sheet 1

Witness
Verdria F. Clark.

By

Inventor
LILBURN HOWARD VAN BRIGGLE

Hood & Schley.
Attorney

Feb. 10, 1925.

L. H. VAN BRIGGLE

CARBURETOR

Filed Aug. 26, 1918

1,526,259

2 Sheets-Sheet 2

Inventor
LILBURN HOWARD VAN BRIGGLE

Patented Feb. 10, 1925.

1,526,259

UNITED STATES PATENT OFFICE.

LILBURN HOWARD VAN BRIGGLE, OF INDIANAPOLIS, INDIANA.

CARBURETOR.

Application filed August 26, 1918. Serial No. 251,449.

*To all whom it may concern:*

Be it known that I, LILBURN HOWARD VAN BRIGGLE, a citizen of the United States, residing at Indianapolis, in the county of Marion and State of Indiana, have invented a new and useful Carburetor, of which the following is a specification.

It is the object of my invention to produce an efficient and economical carburetor having no moving parts and of simple and inexpensive construction.

Figure 1:
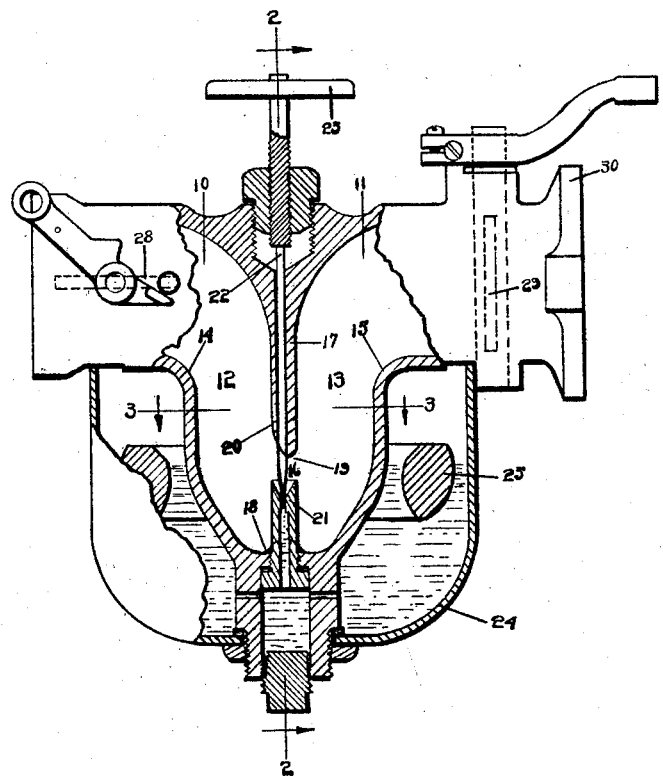
Figure 2:
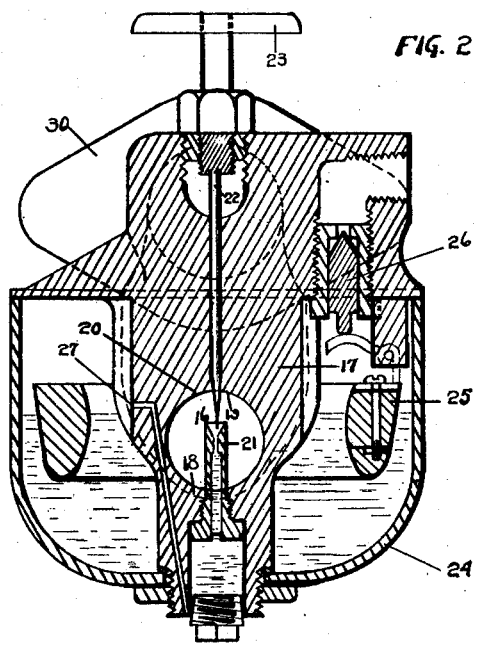
Figure 3:
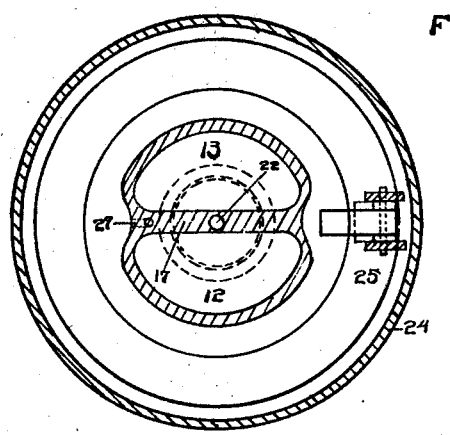

The accompanying drawings illustrate my invention: Fig. 1 is a vertical central section through a carburetor embodying my invention; Fig. 2 is a section on the line 2—2 of Fig. 1; and Fig. 3 is a section on the line 3—3 of Fig. 1.

The carburetor comprises a single air conduit having a horizontal inlet portion 10, a horizontal outlet portion 11, and a central vertical U-shaped portion the two legs 12 and 13 of which communicate with each other at their lower ends and with the horizontal inlet and outlet portions 10 and 11 at their respective upper ends. The communication of the upper ends of the legs 12 and 13 with the horizontal portions 10 and 11 is by relatively sharp turns past the corners 14 and 15. The effective cross-sectional area of this conduit is preferably substantially uniform throughout its length, save at the point of communication 16 between the two legs 12 and 13, where it is slightly contracted to give a venturi effect. The portions 10 and 11 are preferably nearly circular in cross section; while in order to get them in a compact space the portions 12 and 13 are more nearly semicircular, separated by the partition 17, so that together they occupy a substantially cylindrical space. The contraction 16 is formed by a raised cross-rib 18 at the lower surface thereof and by the tapering lower end of the partition 17. The tapering of such lower end is preferably unsymmetrical with respect to the center of the partition, so that the apex 19 of such tapering is well over toward the upward leg 13 of the U-shaped portion and is connected to the side of the partition 17 forming the wall of the downward leg 12 by a rather long incline 20. A fuel nozzle 21 projects vertically upward within the contraction 16 well toward the lower edge of the partition 17, and is displaced from the apex 19 toward the downward leg 12, as by being placed substantially in line with the partition 17. The outlet from this fuel nozzle 21 is controlled by a needle 22, which extends down though the partition 17 and is provided with any suitable operating means 23 at the top. The nozzle 21 receives its supply of fuel by suitable passageways from a float bowl 24, in which a substantially constant fuel level is maintained by a float 25 operating a float valve 26 controlling the supply of fuel thereto in the usual manner. The float bowl 24 fits up around the outside of the U-shaped portion 12—13, which it can do with great compactness because of the substantially cylindrical shape of this U-shaped portion as a whole (Fig. 3). The float is arranged so as to maintain in the float bowl 24 a normal liquid level barely higher than the top of the fuel nozzle 21, so that when the parts are at rest the fuel overflows from the nozzle 21 to fill the lower part of the U-shaped portion 12—13 to the height of the liquid level in the float bowl. An overflow duct 27 is provided in the partition 17, and communicates with the interior of the float bowl at a point slightly higher than the normal liquid level in the float bowl 24; so as to carry off the excess fuel in case the U-shaped portion 12—13 fills to too high a level, as may sometimes momentarily happen.

The inlet portion 10 is conveniently provided with the ordinary choker valve 28, and may communicate with the atmosphere either directly as shown or through any suitable connection, it being essential merely that there be a substantially horizontal portion 10 supplying the downward leg 12. Similarly, the outlet portion 11 has the usual throttle 29, and is provided with a flange 30 for attachment to the intake manifold.

In operation, the flow of air is produced by the suction of the engine in the usual manner, and the air travels through the horizontal portion 10 of the air conduit, around the corner 14 and down through the downward or anterior leg 12, through the contraction 16, upward through the upward or posterior leg 13, around the corner 15 and through the horizontal outlet portion 11, and on to the intake manifold and the engine. This flow is controlled in the usual manner by the throttle 29, and enrichment is caused by the choker 28 in the usual manner. The suction at the contraction 16 causes fuel to be discharged from the nozzle 21 and mixed with the passing air to produce the desired explosive mixture. By providing the sharp corners 14 and 15 around which the air must pass, and the partition 17 which extends downward below the level of such corners, the air is caused to travel in a tortuous path, which in practice seems to vary slightly in its shape within the air conduit in accordance with the amount of air traveling through said conduit—that is, which depends on the load and speed of the engine, as controlled by the throttle 29. In any event, this tortuously traveling air picks up the fuel from the nozzle 21 in the proper proportions, (the needle 22 being properly adjusted,) for both high and low speeds and great and small loads; and the "loading" or excess of fuel at high speeds, frequently found in simple carburetors, not only does not occur, but instead there is if anything a slight decrease in the proportionate amount of fuel at higher speeds, as is desirable. This is caused to some extent by the lateral displacement between the nozzle 21 and the apex 19, so that the long incline 20 directs the air somewhat into the fuel nozzle 21. In any case, the best results are obtained by having the relatively sharp corner 14, and by locating the nozzle 21 so that it is displaced slightly toward the downward leg 12 from the apex 19.

When the engine stops, the lower part of the U-shaped portion 12—13 partly fills with fuel, to the level in the float bowl 12; and this acts as a priming charge when the engine is next started, so as to facilitate starting. In addition, at very low speeds this U-shaped portion also partly fills with fuel, though to a lower level; and this spool of fuel serves to provide an accelerating charge when the speed of the engine is next increased. Idling is effectively obtained, because of the gravity discharge of the fuel from the fuel nozzle under low engine speeds, so that it is not necessary for the suction then to draw the fuel from the nozzle.

I claim as my invention:

1. A carburetor comprising an air conduit having an intermediate U-shaped portion, and a horizontal inlet portion and a horizontal outlet portion connected to the upper ends of the respective legs of said U-shaped portion, such connection between the horizontal inlet portion and the anterior leg of the U being by a relatively sharp bend; and a fuel nozzle projecting upwardly within and opening upwardly into the bottom of said U-shaped portion at a point displaced toward the anterior leg from the apex of the partition between the two legs.

2. A carburetor comprising an air conduit having an intermediate U-shaped portion, and a horizontal inlet portion and a horizontal outlet portion connected to the upper ends of the respective legs of said U-shaped portion, such connections being by relatively sharp turns; and a fuel nozzle projecting upwardly within and opening upwardly into the bottom of said U-shaped portion at a point displaced toward the anterior leg from the apex of the partition between the two legs.

3. A carburetor comprising an air conduit having an intermediate U-shaped portion with close substantially parallel legs separated by a partition, and a horizontal inlet portion and a horizontal outlet portion connected to the upper end of the respective legs of said U-shaped portion; and a fuel nozzle projecting upwardly within and opening upwardly into the bottom of said U-shaped portion at a point displaced toward the anterior leg from the apex of the partition between the two legs.

4. A carburetor comprising an air conduit having a U-shaped portion, and a horizontal inlet portion connected to the upper end of the anterior leg of said U-shaped portion; a fuel nozzle projecting upwardly within and opening upwardly into the bottom of said U-shaped portion, the legs of said U-shaped portions each being substantially semi-circular in cross-section so that together they are substantially circular in cross-section; and a float bowl surrounding the lower end of said U-shaped portion and communicating with said nozzle to supply it.

5. A carburetor comprising an air conduit having a U-shaped portion, and a horizontal inlet portion connected to the upper end of the anterior leg of said U-shaped portion; a fuel nozzle projecting upwardly within and opening upwardly into the bottom of said U-shaped portion; and a float bowl communicating with said fuel nozzle to supply it, the normal liquid level in said float bowl being slightly above the discharge end of said nozzle.

6. A carburetor comprising an air conduit having a U-shaped portion, and a horizontal inlet portion connected to the upper end of the anterior leg of said U-shaped portion; a fuel nozzle projecting upwardly within and opening upwardly into the bottom of said U-shaped portion; and a float bowl communicating with said fuel nozzle to supply it, the normal liquid level in said float bowl being slightly above the discharge end of said nozzle, and an overflow duct communicating with said U-shaped portion at a point higher than the liquid level maintained in said float bowl.

7. A carburetor comprising an air conduit having a U-shaped portion, and a horizontal inlet portion connected to the upper end of the anterior leg of said U-shaped portion, said conduit being slightly contracted where the two legs of the U-shaped portion communicate with each other; and a fuel nozzle projecting upwardly within and opening upwardly into the bottom of said U-shaped portion at a point displaced toward the anterior leg from the apex of the partition between the two legs.

8. A carburetor comprising an air conduit having a U-shaped portion, and a horizontal inlet portion connected to the upper end of the anterior leg of said U-shaped portion, said conduit being slightly contracted where the two legs of the U-shaped portion communicate with each other; and a fuel nozzle porjecting upwardly within and opening upwardly into the bottom of said U-shaped portion, the lower end of the partition between the two legs of the U-shaped portion being tapered, with the apex of such taper offset from the fuel nozzle toward the posterior leg of the U.

9. A carburetor comprising an air conduit having a U-shaped portion, and a horizontal inlet portion connected to the upper end of the anterior leg of said U-shaped portion, such connection between the horizontal inlet portion and the anterior leg of the U being by a relatively sharp bend; and a fuel nozzle projecting upwardly within and opening upwardly into the bottom of said U-shaped portion at a point displaced toward the anterior leg from the apex of the partition between the two legs.

10. A carburetor comprising an air conduit having a U-shaped portion, and a horizontal inlet portion connected to the upper end of the anterior leg of said U-shaped portion; and a fuel nozzle projecting upwardly within and opening upwardly into the bottom of said U-shaped portion at a point displaced toward the anterior leg from the apex of the partition between the two legs.

In witness whereof, I have hereunto set my hand at Indianapolis, Indiana, this 23d day of August, A. D. one thousand nine hundred and eighteen.

LILBURN HOWARD VAN BRIGGLE.

Witnesses:
 OTTIS J. CLEMANS,
 GEO. B. SCHLEY.